United States Patent

Kaske et al.

[15] 3,696,349

[45] Oct. 3, 1972

[54] BLOCK ORGANIZED RANDOM ACCESS MEMORY

[72] Inventors: Alan D. Kaske; Gerald F. Sauter, both of Minneapolis, Minn.

[73] Assignee: Sperry Rand Corporation, New York, N.Y.

[22] Filed: June 4, 1971

[21] Appl. No.: 149,970

[52] U.S. Cl..340/174 NC, 340/174 TF, 340/174 AG

[51] Int. Cl. ............................................G11c 11/14

[58] Field of Search........340/174 TF, 340 NC, 8 AG

[56] References Cited

UNITED STATES PATENTS

| | | | |
|---|---|---|---|
| 3,406,659 | 10/1968 | Oberg | ..................340/174 TF |
| 3,624,621 | 11/1971 | Moser | ..................340/174 TF |

*Primary Examiner*—Bernard Konick
*Assistant Examiner*—Gary M. Hoffman
*Attorney*—Kenneth T. Grace, Thomas J. Nikolai, Donald W. Phillion and John P. Dority

[57] ABSTRACT

A three-dimensional magnetizable memory stack of Mated-Film memory elements each of which provides a substantially closed flux path, except for a gap transverse to the element's easy axis, is disclosed. The stack is comprised of a plurality of superposed, i.e., laid one upon the other so as to make all like-oriented-parts vertically coincide, similar transfer arrays sandwiched between a write array and a read array, all arrays having similarly arranged Mated-Film write/read, transfer memory elements with a gap in the top layer for providing an external longitudinal steering field $\pm H_L$ across the gap that is inductively coupled to each next superposed memory element. Information is written into the memory elements of the write array using word-organized coincident currents. Information from each memory element is then transferred vertically through the stack in successive transfer operations between each next super-posed memory element by using the steering field $\pm H_L$ of the next bottom memory element in coincidence with an applied transverse DC drive field $H_T$ at the next top memory element. The information written in the bottom write array is successively transferred or shifted from transfer array to transfer array and into the top read array from which it is read out in a word-organized random-access manner.

5 Claims, 15 Drawing Figures

INVENTORS
ALAN D. KASKE
GERALD F. SAUTER

BY Kenneth S Grace
ATTORNEY

BLOCK ORGANIZED RANDOM ACCESS MEMORY

BACKGROUND OF THE INVENTION

Various three-dimensional magnetizable memory stack arrangements of Mated-Film memory elements have been proposed in the prior art. In the R. J. Bergman, et al., U.S. Pat. No. 3,357,004 there is taught a magnetizable Mated-Film memory element that includes two superposed thin-ferromagnetic-film layers in which each layer has a central body portion that envelopes a first drive line and wherein said central body portions have sides overlapping an enveloped drive line. The overlapping sides form closely coupled mated-film portions on both sides of the enveloped drive line thereby creating a substantially closed flux path about the enveloped, i.e., internal to the flux path, drive line. Further included is a second drive line that envelopes, i.e., is external to the flux path, said body portion. The enveloped first drive line functions as a bit/sense line while the enveloping second drive line functions as a word line. With the bit/sense lines and the word lines of the matrix array of such Mated-Film memory elements arranged in an orthogonal two-dimensional array there is provided a word-organized memory array of compact configuration, a three-dimensional array of which provides a memory stack of high volumetric efficiency, i.e., many memory elements per cubic inch.

In the R. J. Bergman, et al., U.S. Pat. No. 3,435,435 there is proposed an electrically alterable, word-organized, random-access memory system that uses Mated-Film memory elements as the memory cells with orthogonally oriented drive fields. In this three-dimensional array of Mated-Film memory elements there is provided a plurality of stacked, similar memory planes wherein each memory plane includes a plurality of pairs of apertures with a like plurality of similar Mated-Film memory elements therebetween. Each of the word lines is passed down through matching apertures, through the plurality of stacked memory planes, and returns up through matching apertures of matching pairs of apertures that envelope the associated Mated-Film memory elements. The Mated-Film memory elements of each two-dimensional memory array are serially coupled by the enveloped bit/sense lines, while as stated above, the enveloping word lines are passed vertically through the stacked, superposed two-dimensional memory planes. First ends of all word lines along the first Y direction are coupled to a first Y selection bus bar while the second end of each word line along a second, orthogonal X direction are separately coupled by separate diodes to a common second X selection bus bar. Thus, by selecting one of the X selection bus bars and one of the Y selection bus bars the word line common to the two selected bus bars is caused to couple a word drive field $H_T$ to the coupled memory elements affecting only one Mated-Film memory element on each of the two-dimensional memory arrays.

SUMMARY OF THE INVENTION

The present invention is directed toward a novel Mated-Film memory element, arrangement and method of operation thereof. The memory stack arrangement of the present invention provides a three-dimensional magnetizable memory stack comprising a plurality of two-dimensional memory arrays in which a multibit memory word, or a plurality thereof, is written into the memory elements of a bottom write array in a word-organized manner, inductivity transferred vertically, bit-parallel, through the vertically superposed memory elements of the transfer arrays and into the memory elements of a top read array from which the bits are read out in a word-organized manner. Each similar two-dimensional array includes a similar array of Mated-Film memory elements arranged in rows and columns each having a gap in the top thin-ferromagnetic-film layer, which gap is transverse or orthogonal to the closed direction of the memory element's remanent magnetization and easy axis. In the transfer arrays the Mated-Film transfer (memory) elements are coupled by only a single external transfer or word line that couples a unipolar transfer or word drive field $H_T$ to the associated transfer elements. In the write array, the Mated-Film write (memory) elements are coupled by an enveloped or internal bit line that couples a bipolar bit drive field $\pm H_L$ to the associated write elements and by an external word line that couples a unipolar word drive field $H_T$ to the associated write elements; the polarity of the bit drive field $H_L$ sets the magnetization of the affected write elements in the associated "1" or "0," e.g., clockwise or counterclockwise around the enveloped or internal bit line, informational states. In the read array the Mated-Film read (memory) elements are coupled by an external word line that couples a unipolar drive field $H_T$ to the associated read elements causing appropriate output signals to be induced in the enveloped sense lines, which signals are indicative of the readout of the informational state of the bit-associated read elements that are affected by the word drive field $H_T$.

Information is written into the write elements of the write array using the coincident bit drive field $H_L$ and word drive field $\pm H_T$. The magnetization of each write element then establishes in the associated gap of its top layer an external longitudinal steering field $\pm H_L$ that is inductively coupled into the next top superposed transfer element of the next top superposed transfer array. The transfer or word line of the next top superposed transfer array is energized by the transfer or word drive field $H_T$ which in coincidence with the steering field $\pm H_L$ of the next bottom write element sets or steers the magnetization of the transfer element of the next top transfer array into a flux orientation along its easy axis, and across its gap, that corresponds to the information content of the next bottom write element of the next bottom write array. By successively, at successive transfer times, coupling the transfer or word drive field $H_T$ to the next successive top superposed transfer and read arrays the information content of the write element of the bottom write array is successively transferred through the next top superposed transfer and read elements of the transfer and read arrays into the read array (using the read array word line to couple a transfer drive field $H_T$ to the associated read element). Information is then read out of the read elements of the read array in a word-organized manner by the coupling of a transfer or word drive field $H_T$ to the selected word line of the read array and detecting the so-generated output signals on the bit-associated sense lines.

DESCRIPTION OF THE PREFERRED EMBODIMENT

Figure 1:
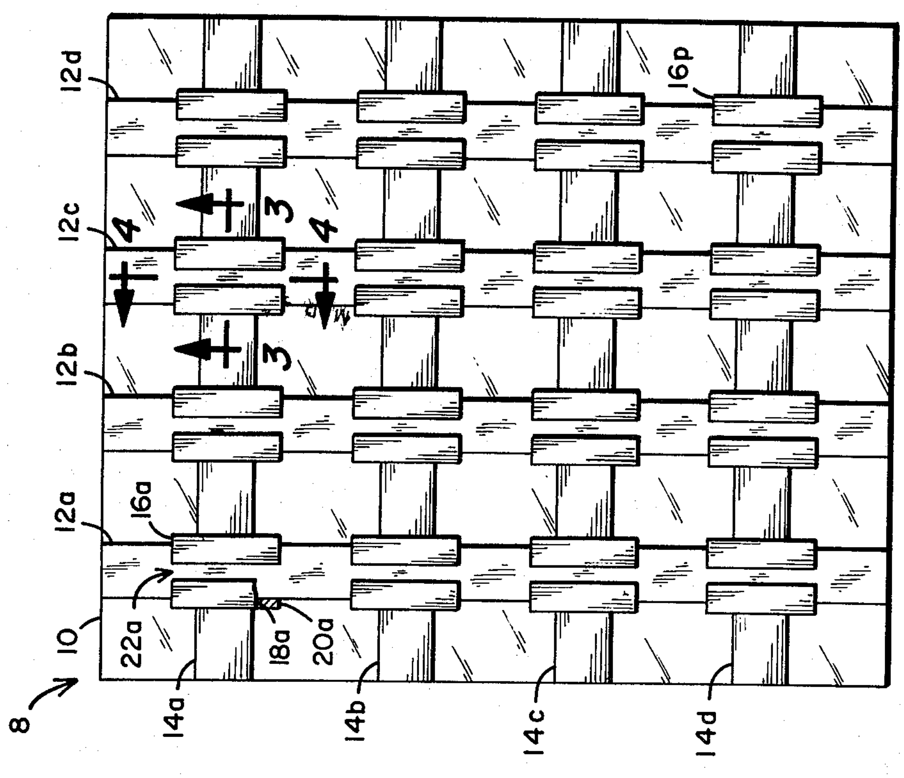
FIG. 1 is a plan view of the write/read array of the present invention.

With particular reference to FIG. 1 there is presented a plan view of the write/read array of the present invention. Two-dimensional write/read array 8 consists of a substrate member 10 upon which are deposited parallel sets of bit/sense lines 12 orthogonally oriented with respect to parallel sets of word lines 14. At each bit/sense line, word line intersection there is a Mated-Film write/read (memory) element 16 each of which consists of two thin-ferromagnetic-film layers 18, 20 having a gap 22 in top layer 18 and sandwiching therebetween or enveloping the associated bit/sense line 12 while both layers 18, 20 and the bit/sense line 12 are superposed the associated word line 14. Drive lines 12, 14 and layers 18, 20 are preferably formed in a continuous vapor deposition manner - see the aforementioned R. J. Bergman, et al., U.S. Pat. No. 3,357,004. Write/read elements 16 are formed of magnetizable material having an anisotropic or easy axis that is transverse or orthogonal to the associated gap 22, in top layer 18, i.e., is parallel to the associated word line 14.

Figure 2:
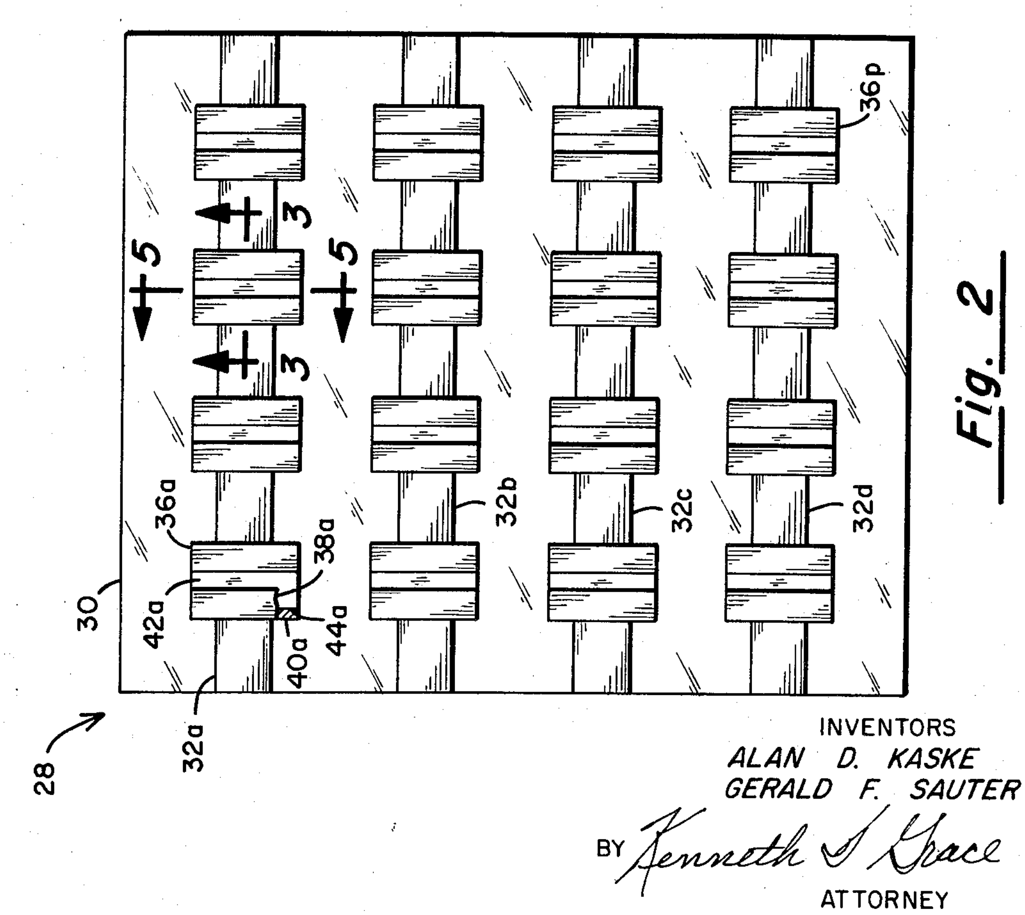
FIG. 2 is a plan view of the transfer array of the present invention.

With particular reference to FIG. 2 there is presented a plan view of the transfer array of the present invention. Two-dimensional transfer array 28 consists of a substrate member 30 upon which are deposited parallel word or transfer lines 32*a*, 32*b*, 32*c*, 32*d*. Superposed transfer lines 32, and having an arrangement similar to Mated-Film write/read elements 16 of write/read array 8 of FIG. 1, are a plurality of Mated-Film transfer (memory) elements 36 each of which consists of two thin-ferromagnetic-film layers 38, 40 sandwiching therebetween a spacer 44 and having a gap 42 in top layer 38. Mated-Film memory elements 16, 36 of two-dimensional arrays 8, 28 are of the similar materials, dimensions and magnetic characteristics so as to provide similar memory functions and operating characteristics having an anisotropic or easy axis transverse or orthogonal to the associated gaps 22, 42, and are somewhat similar to the dynamic magnetic read head of the G. F. Sauter, et al., U.S. Pat. application, Ser. No. 39,515 filed May 21, 1970 and assigned to the Sperry Rand Corporation as is the present invention. In their planar arrangement, arrays 8, 28 have their respectively associated memory elements 16, 36 oriented in similar matrix conformations whereby memory elements 16, 36, when arrays 8, 28 are arranged in a stacked superposed manner, are directly superposed with their gaps 22, 42 in direct superposition, i.e., oriented directly above each other.

In a preferred embodiment the following noted elements of arrays 8, 28 may have the following characteristics.

| | |
|---|---|
| Substrate Members 10, 30 | Glass 0.0030 inch thick |
| Lines 12 | Copper 40,000 angstroms (A) thick 0.0060 inch wide on 0.020 center-to-center spacing |
| Lines 14, 32 | Copper 40,000 A thick 0.0060 inch wide on 0.030 inch center-to-center spacing |
| Spacer 44 | Copper 40,000 A thick 0.0060 inch wide 0.020 inch long |
| Layers 18, 20, 38, 40 | 81% Ni - 19% Fe, 2,000 A thick 0.010 inch wide 0.020 inch long |
| Gaps 22, 42 | 0.0010 inch wide 0.020 inch long |

Figure 3:
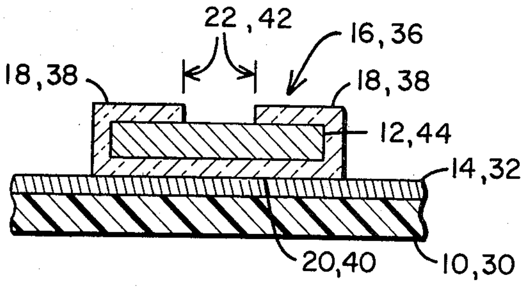
FIG. 3 is a diagrammatic sectional view of the Mated-Film write, transfer, read elements of the present invention taken along line 3—3 of FIGS. 1 and 2.

With particular reference to FIG. 3 there is presented a diagrammatic illustration of a cross-sectional view of the Mated-Film write/read, transfer elements 16, 36 taken along lines 3—3 of FIGS. 1 and 2. This cross-sectional view is presented to illustrate that the elements 16, 36 have similar dimensional and element characteristics in a cross-sectional view taken normal to the associated gaps 22, 42. It is to be appreciated that because of the nature of the relative dimensional characteristics of the elements illustrated in their respective figures the views are diagrammatic only with no intention to show relative dimensions.

Figure 4:
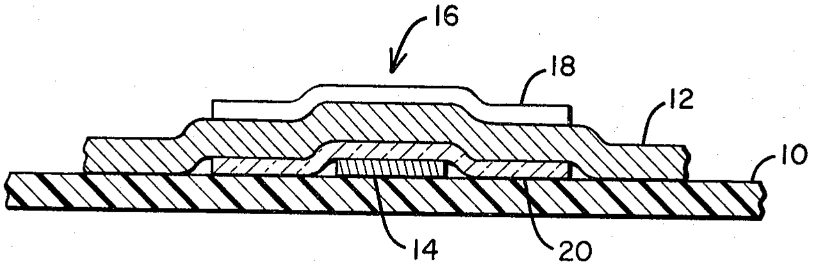
FIG. 4 is a diagrammatic sectional view of the write/read element of the present invention taken along line 4—4 of FIG. 1.

With particular reference to FIG. 4 there is presented a diagrammatic illustration of a cross-sectional view of the Mated-Film write/read element 16 of the present invention taken along line 4—4 of FIG. 1. This cross-sectional view is presented to illustrate the stacked relationship of substrate member 10, word line 14, bottom layer 20, bit/sense line 12 and top layer 18 with layers 18, 20 sandwiching internal bit/sense line 12 therebetween and both layers 18, 20 superposed external word line 14.

Figure 5:
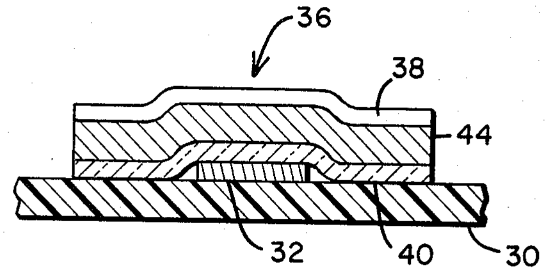
FIG. 5 is a diagrammatic sectional view of the Mated-Film transfer element of the present invention taken along line 5—5 of FIG. 2.

With particular reference to FIG. 5 there is presented a diagrammatic illustration of a cross-sectional view of the Mated-Film transfer element of the present invention taken along line 5—5 of FIG. 2. This cross-sectional view is presented to illustrate the stacked relationship of substrate member 30, word line 32, bottom layer 40, spacer 44 and top layer 38 with layers 38, 40 sandwiching spacer 44 therebetween and both superposed external word line 32. Because spacer 44 is only utilized in transfer element 36 to provide the similar memory functions and operating characteristics as those of write/read elements 16, spacer 44 need not be of copper construction as is bit line 12 but may be of many materials such as silicon dioxide or silver preferably having nonmagnetizable, i.e., negligible magnetic retentivity, characteristics.

Figure 6:
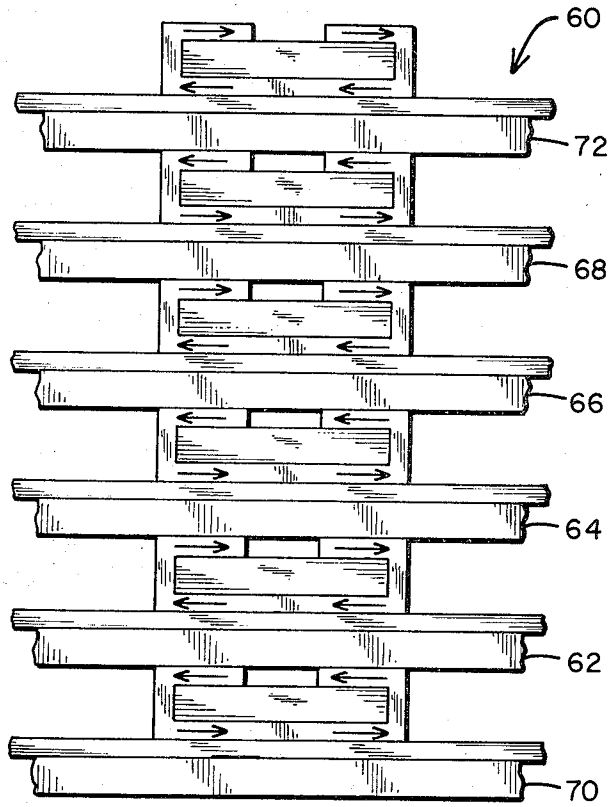
FIG. 6 is a diagrammatic sectional view of a three-dimensional memory stack including four transfer arrays sandwiched between a bottom write array and a top read array.

With particular reference to FIG. 6 there is presented a diagrammatic illustration of a cross-sectional view of a memory stack 60 including four transfer arrays 62, 64, 66, 68 sandwiched between a bottom write array 70 and a top read array 72 taken along a plane normal to the gaps of the associated memory elements, and, accordingly, orthogonal to the planes of their associated substrate members. This view illustrates the storage of similar memory states, e.g., all "1's" or "0's," in all of the superposed, i.e., laid one upon the other so as to make all like parts vertically coincide, memory elements. This storage of similar memory states is noted by the alternate clockwise, counterclockwise orientation of their magnetization in a substantially closed flux path around the sandwiched bit/sense lines and spacers, across their gaps and parallel to their easy axes. As will be explained infra, such alternate flux orientation for like data storage is due to the manner in which the external or steering field $\pm H_L$ of the next bottom memory element affects the magnetization of the next top memory element steering it toward a closed flux path with the flux of the steering next bottom memory element, or steering memory element, when the next top memory element, or storing element, is concurrently affected by a transfer drive field $H_T$ as when its associated word or transfer line is energized by a transfer or word signal.

Figures 7, 8:
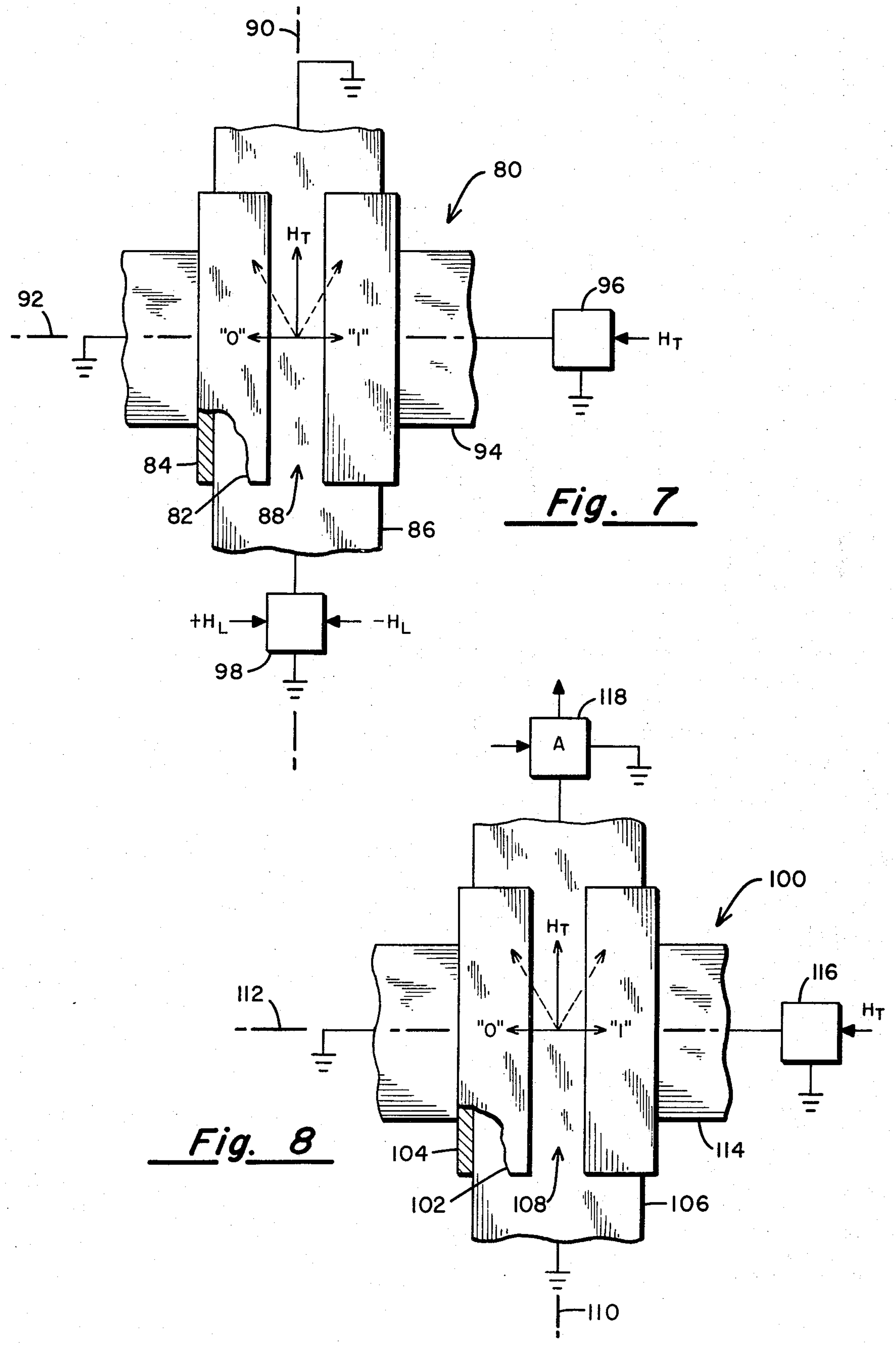
FIG. 7 is a plan view of a single Mated-Film write element of the present invention.
FIG. 8 is a plan view of a single Mated-Film read element of the present invention.

With particular reference to FIGS. 7 and 8 there are presented plan views of single Mated-Film write and read elements, respectively, of the write/read array 8 of FIG. 1. Write element 80 of FIG. 7, as discussed with reference to FIG. 1, includes top and bottom thin-ferromagnetic-film layers 82, 84 sandwiching copper bit line 86 therebetween. Top layer 82 includes a gap 88 that is parallel to axis 90, which is the longitudinal axis of enveloped bit line 86, and orthogonal to axis 92 which is the longitudinal axis of the external transfer or word line 94. Coupled to word line 94 is a pulse source 96 for coupling the unipolar transverse write drive field $H_T$ to write element 80 while coupled to enveloped bit line 86 is a pulse source 98 for coupling a bipolar write or bit drive field $\pm H_L$ to bit line 86.

Read element 100 of FIG. 8, as discussed with reference to FIG. 1, is similar to write element 80 of FIG. 7 and includes top and bottom thin-ferromagnetic-film layers 102, 104 sandwiching copper sense line 106 therebetween. Top layer 102 includes a gap 108 that is parallel to axis 110, which is the longitudinal axis of enveloped sense line 106, and orthogonal to axis 112 which is the longitudinal axis of external transfer or word line 114. Coupled to word line 114 is a pulse source 116 for coupling the unipolar transverse read or transfer drive field $H_T$ to read element 100 while coupled to enveloped sense line 106 is a gated sense amplifier 118 for detecting the output signal induced in sense line 106 by the effect of the unipolar read drive field $H_T$.

Figure 9:
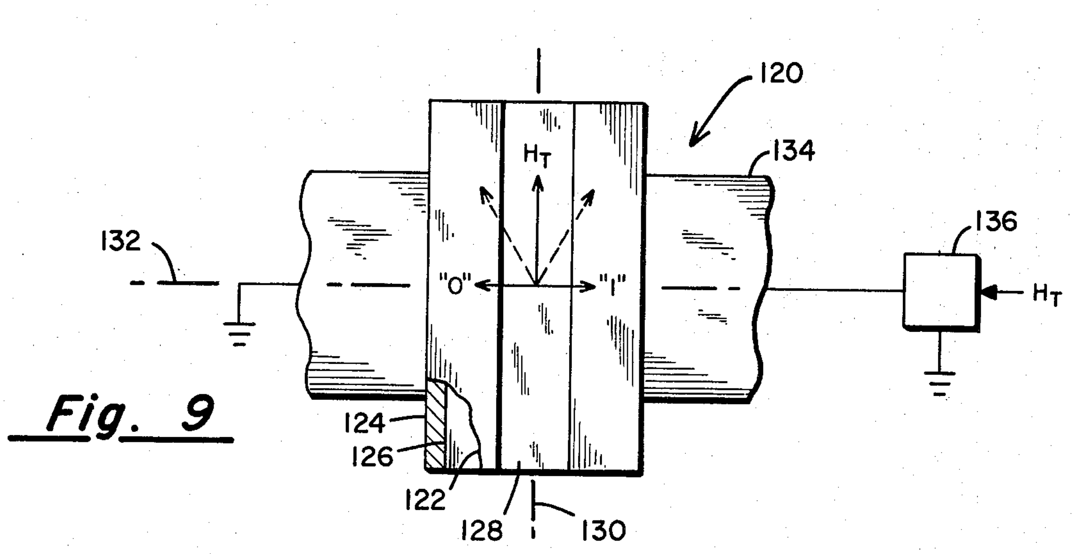
FIG. 9 is a plan view of a single Mated-Film transfer element of the present invention.

With particular reference to FIG. 9 there is presented a plan view of a single Mated-Film transfer element of the transfer array 28 of FIG. 2. Transfer element 120 of FIG. 9, as discussed with reference to FIG. 2, includes top and bottom thin-ferromagnetic-film layers 122, 124 sandwiching copper spacer 126 therebetween. Top layer 122 includes a gap 128 that is parallel to axis 130 and orthogonal to axis 132 which is the longitudinal axis of external transfer or word line 134. Coupled to word line 134 is a pulse source 136 for coupling the unipolar transfer or word drive field $H_T$ to transfer element 120 which when coincident with a bipolar longitudinal steering field $\pm H_L$ from the next bottom write or transfer element transfers the informational state of such next bottom (memory) element into the instant or next top transfer element.

As discussed supra, the present invention is directed towards a three-dimensional magnetizable memory stack comprising a plurality of similar two-dimensional arrays in which a multibit memory word, or plurality thereof, is written into a bottom write array in a word-organized manner, is inductively transferred vertically, bit-parallel, through the vertically superposed transfer elements into a top read array from which the bits are read out in a word-organized manner. In the transfer arrays (see FIG. 2) the transfer elements are coupled by only a single transfer or word line that couples a unipolar transfer or word drive field $H_T$ to the associated transfer elements. In the write array (see FIG. 1) the write elements are coupled by an enveloped bit line that couples a bipolar bit drive field $\pm H_L$ to the associated write elements and by an external word line that couples a unipolar word drive field $H_T$ to the associated write elements; the polarity of the bipolar bit drive field $\pm H_L$ sets the magnetization of the affected write elements in the "1" or "0," e.g., clockwise or counterclockwise, informational state. In the read array (see FIG. 1) the read elements are coupled by an external word line that couples a unipolar word drive field $H_T$ to the associated read elements causing appropriate output signals to be induced in the enveloped sense line which output signals are indicative of the readout of the informational state of the sense line bit-associated read elements that are affected by the word drive field $H_T$.

Information is written into the write elements of the write array using coincident bit drive field $\pm H_L$ and word drive field $H_T$. The magnetization of each write element establishes in the associated gap of its top layer an external steering field $\pm H_L$ that is inductively coupled into the next top superposed transfer element of the next top superposed transfer array. The word line of the next top superposed transfer array is energized by the word drive field $H_T$, which in coincidence with the steering field $\pm H_L$ of the next bottom superposed write element sets the magnetization of the transfer element of the next top superposed transfer array into a flux orientation along its easy axis, and across its gap, that corresponds to the information content of the next bottom superposed write element of the next bottom superposed write array. By successively, at successive transfer times, coupling the word drive field $H_T$ to the next successive top superposed transfer array the informational content of the write element of the bottom superposed write array is successively transferred through the next top superposed transfer elements of the transfer arrays into the read array (using the word line to couple a transfer or word drive field $H_T$ to the associated read elements). Information is then read out of the read elements of the read array in a word-organized manner as discussed above. Note that the use of the symbols $H_T$, $H_L$ herein does not denote similarity of field intensity but only the directional orientation of the field with respect to the easy axis of the affected memory element.

Figure 10A:
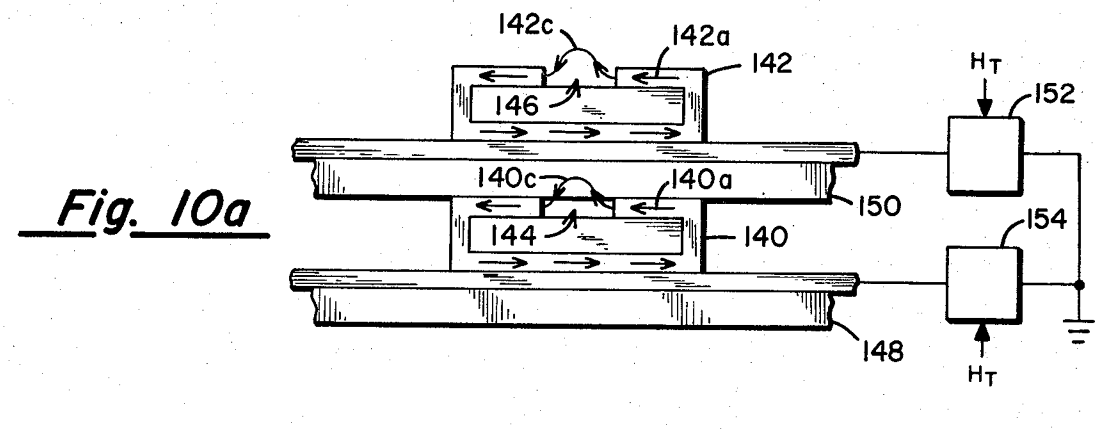
FIGS. 10*a*, 10*b*, 10*c* are diagrammatic sectional views of a next bottom superposed write, transfer element and a next top superposed transfer, read element of the present invention illustrating the flux orientations during the transfer operation.
Figure 10B:
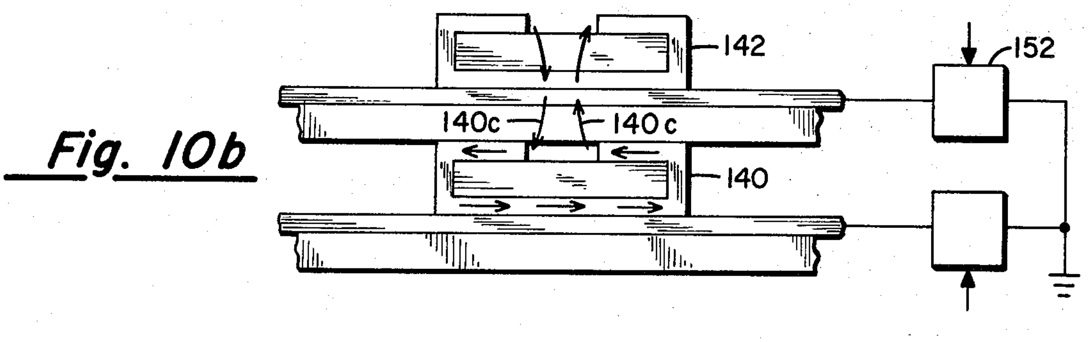
Figure 10C:
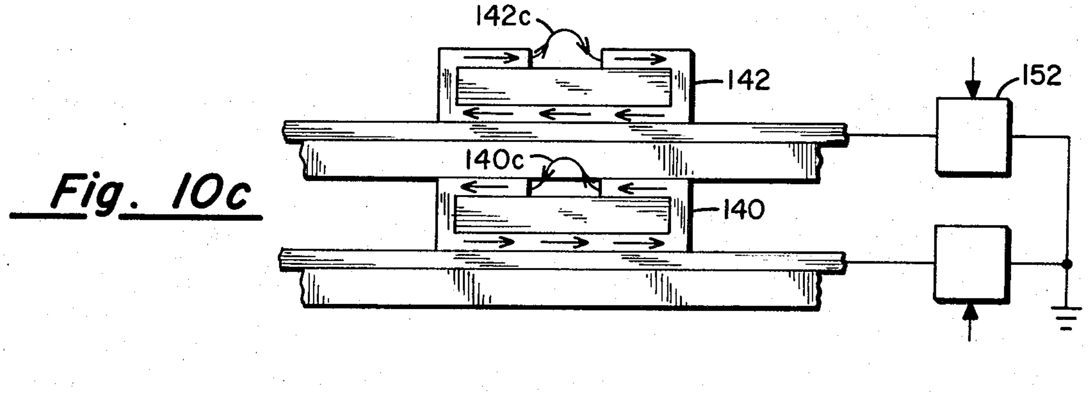

Using the above general discussion of the mode of operation of the present invention as a background, detail operation of the write-transfer-read operation of the present invention shall now be discussed. Using FIG. 9 as a basis of the discussion of the fields involved, there are presented in FIGS. 10*a*, 10*b*, 10*c* diagrammatic cross-sectional views of two superposed Mated-Film transfer elements 140, 142 taken normal to their gaps 144, 146 and, accordingly, the planes of their substrate members 148, 150, respectively. In FIG. 10a transfer elements 140, 142 are assumed to have their magnetization priorly set into a counterclockwise, counterclockwise orientation, respectively, as noted by arrows 140a, 142 producing the associated external $H_L$ steering fields 140c, 142c in the areas of their gaps 144, 146, respectively. When pulse source 152 couples a transfer or word drive field $H_T \geq H_K$ of transfer element 142, to transfer element 142 — see FIG. 9 — the magnetization of transfer element 142 is rotated away from alignment with its easy axis 132 into alignment along its hard axis 130 whereupon the permeability of transfer element 142 is greatly increased from its static stored clockwise, e.g., "1," or counterclockwise, e.g., "0," state. Transfer element 142 is then in an essentially demagnetized state of high permeability permitting the $H_L$ steering field 140c of transfer element 140 to steer or bias the transfer or word drive field $H_T$ in the gap 146 of transfer element 142 away from its otherwise hard axis 130 alignment towards its easy axis 132 in the left-hand (or right-hand) direction according to the magnetization orientation of transfer element 140 and the resulting polarization of its $H_L$ steering field 140*c*. This condition is illustrated by FIG. 10*b* in which the $H_L$ steering field 140*c* of transfer element 140 is coupled into transfer element 142. Upon the release or termination of the transfer or word drive field $H_T$ by pulse source 152, the right-hand directionally biased magnetization of transfer element 142, see FIG. 9 and 10*b*, switches the magnetization of transfer element 142, see FIG. 9 and 10*b*, into a clockwise orientation as illustrated in FIG. 10*c*. At this time the magnetization of transfer element 142 has been switched from the counterclockwise orientation of FIG. 10*a* according to the orientation of the counterclockwise $H_L$ steering field 140*c* of transfer element 140. This is the performance of a transfer operation or function, i.e., transferring the information content of the next bottom superposed transfer element 140 into the next top superposed transfer element 142, using coincident steering field $\pm H_L$ and transfer or word drive field $H_T$. Of course, if the magnetization of transfer element 142 had originally been in a clockwise orientation it would have returned to its original clockwise orientation after completion of the transfer operation described above.

As noted above, the writing operation, i.e., the simultaneous writing of all of the bits of a multibit word in a write array, is accomplished by the well-known method of coupling coincident bit drive field $\pm H_L$ to the respective bit lines and word drive field $H_T$ to the one selected word line. This operation is detailed in FIG. 7 wherein the pulse source 98 couples the bit drive field $\pm H_L$ to the respective bit lines 86 while pulse source 96 concurrently couples word drive field $H_T$ to the one selected word line 94. Upon release or termination of word drive field $H_T$ by pulse source 96, the bit drive field $\pm H_L$ steers the magnetization of the write element 80 into the alternative left-hand counterclockwise or right-hand clockwise orientation. Transfer of the information from the write array to the next superposed transfer array is similar to the transfer operation discussed above with respect to FIGS. 9, 10*a*, 10*b*, 10*c* except that the bit drive field $\pm H_L$ replaces and performs the same function as the steering field $\pm H_L$ used in the transfer operation.

The transfer of information from the top transfer array into the read array is similar to the transfer operation discussed above with respect to FIGS. 9, 10*a*, 10*b*, 10*c*. The fact that a read element 100 includes an enveloped sense line 106 — see FIG. 8 — whereas a transfer element 120 includes a spacer 126 — see FIG. 9 — requires no deviation from the transfer of information from transfer array to perform the transfer of information from a transfer array to the read array.

As noted above, the transfer of a bit of information from the bottom write array through the transfer arrays and into the read array through successive transfer operations causes the flux orientation of adjacent, next superposed write, transfer and read elements to undergo successive clockwise, counterclockwise reversals. Thus, in the present invention magnetization orientation clockwise (right-hand-directioned as seen from the top) or counterclockwise (left-hand-directioned as seen from the top) in the write, transfer and read elements does not have a consistent meaning throughout the memory stack. That is, if a "1" is written in a write element as a clockwise magnetization orientation, upon its transfer into the next adjacent superposed transfer element the "1" becomes a counterclockwise magnetization orientation. This flux reversal occurring upon every transfer operation through the three-dimensional stack is of no significance for the electronics associated with the read array, such as the gated sense amplifier 118 of FIG. 8, may accommodate any single polarity variation due to the use of odd or even numbers of transfer arrays.

Figure 11:
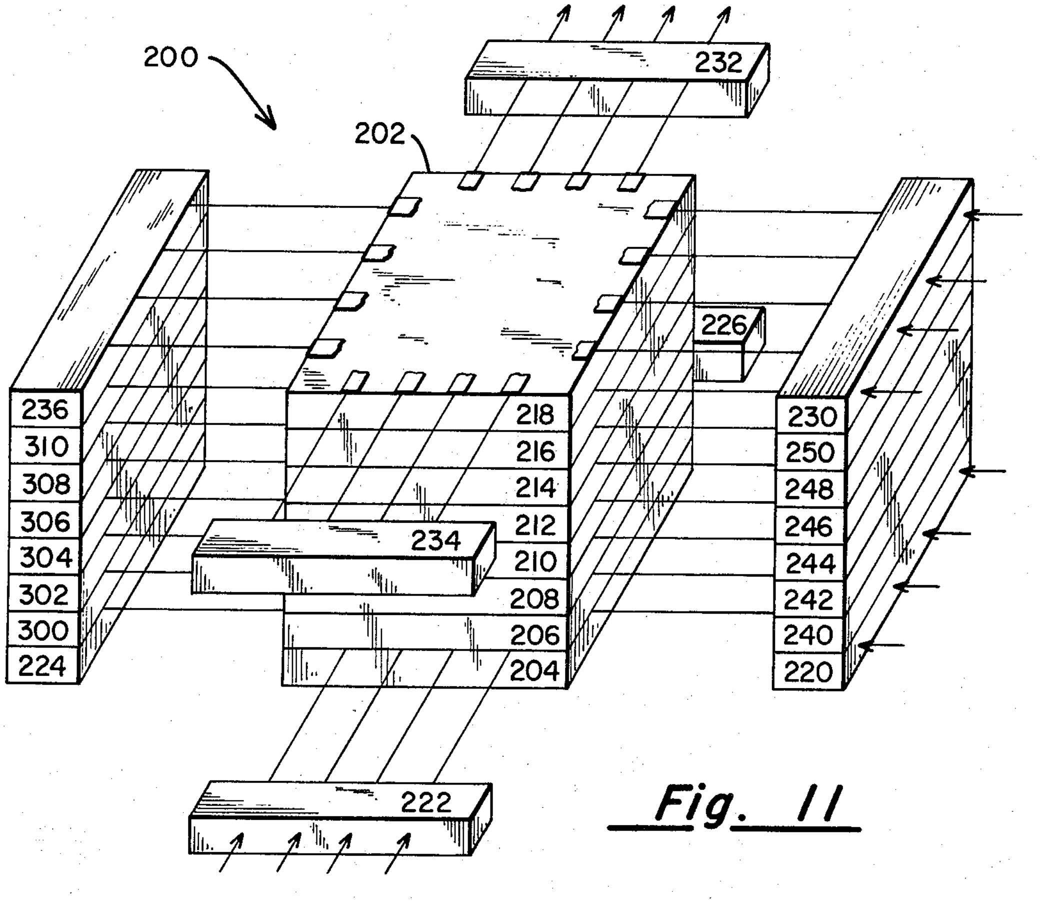
FIG. 11 is a diagrammatic illustration of a memory system incorporating a three-dimensional memory stack of the present invention.

With particular reference to FIG. 11 there is presented a diagrammatic illustration of a memory system incorporating the three-dimensional memory stack of the present invention. Memory system 200 includes a three-dimensional memory stack 202 that is comprised of a bottom write array 204, superposed transfer arrays 206, 208, 210, 212, 214, 216 and superposed top read array 218. These two-dimensional arrays of Mated-Film write, transfer and read (memory) elements are illustrated as conforming to the arrangements of FIGS. 1 and 2; however, many other arrangements may be possible such as write/read arrays containing a plurality of separate word lines whereby a plurality of separate multibit words may be selectively written into the write array and individually and selectively passed through the three-dimensional memory stack as required. Coupled to write array 204 are; $H_T$ word driver 220, $\pm H_L$ bit driver 222, terminal 224 and terminal 226; coupled to read array 218 are, $H_T$ word driver 230, gated sense amplifier 232, terminal 234 and terminal 236; coupled to transfer arrays 206, 208, 210, 212, 214, 216 are $H_T$ word drivers 240, 242, 244, 246, 248, 250, respectively, and terminals 300, 302, 304, 306, 308, 310, respectively.

Figure 12:
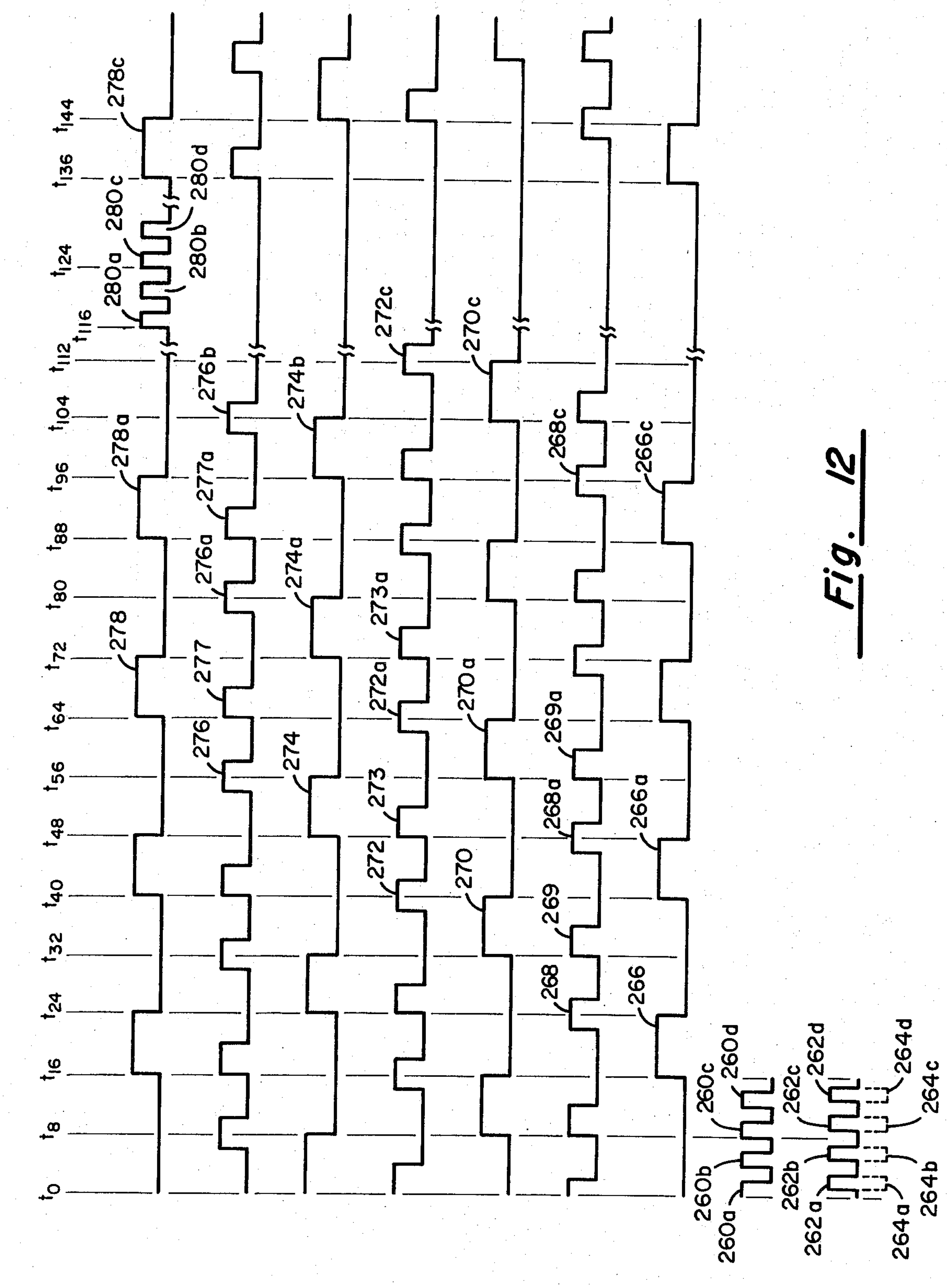
FIG. 12 is an illustration of a timing diagram associated with the operation of the memory system of FIG. 11.

Operation of memory system 200 of FIG. 11 will be discussed with reference to the timing diagram of FIG. 12 which illustrates in time sequence the successive write-in, transfer and read-out operations. Initially, at time $t_0$, at the initiation of the write-in operation word driver 220 couples an $H_T$ word drive field 260*a* to a selected one of the word lines 14 of write array 204, e.g., word line 14*a*. Subsequently, at a time $t_1$ concurrent with the application of the $H_T$ word drive field 260*a* to word line 14*a*, bit driver 222 couples a $\pm H_L$ bit drive field 262*a* or 264*a*, indicative of the write-in of a binary "1" or of a "0," to the bit lines 12*a*, 12*b*, 12*c*, 12*d* of write array 204. Subsequently, at time $t_2$ word driver 220 terminates its $H_T$ word drive field 260*a* whereupon the continually applied $\pm H_L$ bit drive field 262*a* or 264*a* sets the magnetization of the affected write elements 16 into a clockwise or counterclockwise orientation. Lastly, at time $t_3$ bit driver 222 terminates its $\pm H_L$ bit drive field 262*a* or 264*a* allowing the remanent magnetization of the so-affected write elements to come to rest in their clockwise or counterclockwise orientation as determined by the polarity of the bipolar $\pm H_L$ bit drive field 262*a* or 264*a*.

An inspection of FIG. 1 indicates that the write element 16 of write array 204 are organized along four word lines 14*a*, 14*b*, 14*c*, 14*d* and four bit lines 12*a*, 12*b*, 12*c*, 12*d*. Accordingly, the above described procedure applies to the write-in operation only, e.g., along the one word line 14*a* with the bipolar $\pm H_L$ bit drive field 262*a* or 264*a* selectively concurrently coupled to the four bit lines 12*a*, 12*b*, 12*c*, 12*d* while concurrently the unipolar $H_T$ word drive field 260*a* is coupled to the one selected word line 14*a*. For the write-in of all of the four-bit words along word lines 14*b*, 14*c*, 14*d* such above described write-in procedure of word line 14*a*, as in conventional word-organized memory arrays, must be repeated in successive write-in operations to fully load the write array 204. This procedure establishes certain well-known limits for the drive fields $\pm H_L$ and $H_T$ whereby information written in one word line is not adversely affected by the write-in of a second word line in the same matrix array. Accordingly, the following drive field intensity characteristics, with respect to the affected Mated-Film write, transfer and read elements, for the operation of memory system 200 are noted:

a. Write-in operation
   Drive field $\pm H_L > H_C$

Drive field $H_T \geq H_K$ b. Transfer operation
   Drive field $H_T \geq H_K$ c. Read-out operation
   Drive field $H_T \geq H_K$ The above described write-in operation in which the desired four-bit word is written into the write (memory) elements 16 along word line 14*a* at the time period $t_0 - t_3$ is repeated for the word lines 14*b*, 14*c*, 14*d* at the time periods $t_4 - t_7$, $t_8 - t_{11}$, $t_{12} - t_{15}$, respectively. Accordingly, at time $t_{15}$, with termination of the bipolar $\pm H_L$ drive field 262*d* or 264*d*, the write array 204 has been fully loaded with the desired 4-bit words being stored in the write elements 16 along word lines 14*a*, 14*b*, 14*c*, 14*d*.

Having written the desired information in write array 204 the transfer operation is initiated at time $t_{16}$. The transfer operation consists of transferring the information written in write array 204 successively through transfer arrays 206, 208, 210, 212, 214, 216 and into read array 218. At time $t_{16}$ word driver 240 couples $H_T$ word drive field 266 to word lines 32*a*, 32*b*, 32*c*, 32*d* of transfer array 206. The $H_T$ word drive field 266 in coincidence with the steering field $\pm H_L$ of the next bottom superposed write element 16 of write array 204 rotates or biases the magnetization of the next top superposed transfer element 36 of transfer array 206 toward alignment with its easy axis — see FIG. 9. Concurrently with word driver 240 coupling the $H_T$ word drive field 266 to the word lines of transfer array 206, at time $t_{22}$ $H_T$ word driver 242 couples an $H_T$ word drive field 268 to the word lines 32*a*, 32*b*, 32*c*, 32*d* of transfer array 208. Word drive field 268 rotates or biases the magnetization of the transfer elements 36 of transfer array 208 into alignment with their hand axis — see FIG. 9 — whereby the $\pm H_L$ steering field that is normally existent in the areas of their gaps 42 is prevented from affecting or steering the magnetization of the transfer elements 36 of the next bottom superposed transfer array 206. When $H_T$ word drive field 266 is terminated at time $t_{24}$ the biased magnetization of the transfer elements 36 of transfer array 206 fall into alignment along their easy axes in a substantially closed (except for their gaps) flux path in a clockwise or counterclockwise orientation as determined by the plurality of the influencing steering fluid $\pm H_L$ of the next bottom superposed write elements 16 of write array 204. This completes the transfer of information stored in write array 204 into transfer array 206.

Subsequently, at time $t_{26}$, $H_T$ word drive field 268 is terminated. At time $t_{32}$ word driver 242 couples an $H_T$ word drive field 269 to the word lines of transfer array 208 and $H_T$ word driver 244 couples an $H_T$ word drive field 270 to the word lines of transfer array 210. $H_T$ word drive field 270 rotates or biases the magnetization of the next top superposed transfer elements 36 of transfer array 210 into alignment with their hard axes — see FIG. 9 — whereby the $\pm H_L$ steering field that is normally existent in the areas of their gaps 42 is prevented from affecting or steering the magnetization of the transfer elements 36 of the next bottom superposed transfer array 208. The $H_T$ word drive field 269 in coincidence with the $\pm H_L$ steering field of the next bottom superposed transfer element 36 of transfer array 206 rotates or biases the magnetization of the next top transfer array 36 of transfer array 208 toward alignment with its easy axis — see FIG. 9. When $H_T$ word drive field 269 is terminated at time $t_{36}$ the biased magnetization of the transfer elements of transfer array 208 fall into alignment along their easy axes in a substantially closed (except for their gaps) flux path in a clockwise or counterclockwise orientation as determined by the plurality of the influencing steering field $\pm H_L$ of the next bottom superposed transfer elements 36 of transfer array 206. This completes the transfer of the information stored in transfer array 206 into transfer array 208.

Concurrently with word driver 244 coupling the $H_T$ word drive field 270 to the word lines of transfer array 210, at time $t_{38}$ $H_T$ word driver 246 couples an $H_T$ word drive field 272 to the word lines 32a, 32b, 32c, 32d of transfer array 212. Word drive field 272 rotates or biases the magnetization of the transfer elements 36 of transfer array 212 into alignment with their hard axes — see FIG. 9 — whereby the $\pm H_L$ steering field that is normally existent in the areas of their gaps 42 is prevented from affecting or steering the magnetization of the transfer elements 36 of the next bottom superposed transfer array 210. When $H_T$ word drive field 270 is terminated at time $t_{40}$ the biased magnetization of the transfer elements 36 of transfer array 210 fall into alignment along their easy axes in a substantially closed (except for their gaps) flux path in a clockwise or counterclockwise orientation as determined by the plurality of the influencing steering field $\pm H_L$ of the next bottom superposed transfer elements 36 of transfer array 208. This completes the transfer of the information stored in transfer array 208 into transfer array 210.

Subsequently, at time $t_{42}$, $H_T$ word drive field 272 is terminated. At time $t_{48}$ word driver 246 couples an $H_T$ word drive field 273 to the word lines of transfer array 212 and $H_T$ word driver 248 couples an $H_T$ word drive field 274 to the word lines of transfer array 214. $H_T$ word drive field 274 rotates or biases the magnetization of the next top superposed transfer elements 36 of transfer array 214 into alignment with their hard axes — see FIG. 9 — whereby the $\pm H_L$ steering field that is normally existent in the areas of their gaps 42 is prevented from affecting or steering the magnetization of the transfer elements 36 of the next bottom superposed transfer array 212. The $H_T$ word drive field 273 in coincidence with the $\pm H_L$ steering field of the next bottom superposed transfer elements 36 of transfer array 210 rotates or biases the magnetization of the next top transfer elements 36 of transfer array 212 toward alignment with their easy axis — see FIG. 9. When $H_T$ word drive field 273 is terminated at time $t_{52}$ the biased magnetization of the transfer elements 36 of transfer array 212 falls into alignment along their easy axes in a substantially closed (except for their gaps) flux path in a clockwise or counterclockwise orientation as determined by the plurality of the influencing steering field $\pm H_L$ of the next bottom superposed transfer elements 36 of transfer array 210. This completes the transfer of information stored in transfer array 210 into transfer array 212.

Concurrently with word driver 248 coupling the $H_T$ word drive field 274 to the word lines of transfer array 214, at time $t_{54}$ $H_T$ word driver 250 couples an $H_T$ word drive field 276 to the word lines 32a, 32b, 32c, 32d of transfer array 216. Word drive field 276 rotates or biases the magnetization of the transfer elements 36 of transfer array 216 into alignment with their hard axes — see FIG. 9 — whereby the $\pm H_L$ steering field that is normally existent in the areas of their gaps 42 is prevented from affecting or steering the magnetization of the transfer elements 36 of the next bottom superposed transfer array 214. When $H_T$ word drive field 274 is terminated at time $t_{56}$ the biased magnetization of the transfer elements 36 of transfer array 214 falls into alignment along their easy axes in a substantially closed (except for their gaps) flux path in a clockwise or counterclockwise orientation as determined by the polarity of the influencing steering field $\pm H_L$ of the next bottom superposed transfer elements 36 of transfer array 212. This completes the transfer of the information stored in transfer array 212 into transfer array 214.

Subsequently, at time $t_{58}$, $H_T$ word drive field 276 is terminated. At time $t_{64}$ $H_T$ word driver 250 couples an $H_T$ word drive field 277 to the word lines of transfer array 216 and $H_T$ word driver 230 couples an $H_T$ word drive field 278 to the word lines of read array 218. $H_T$ word drive field 278 rotates or biases the magnetization of the next top superposed read element 16 of read array 218 into alignment with their hard axes — see FIG. 9 — whereby the $\pm H_L$ steering field that is normally existent in the areas of their gaps 22 is prevented from affecting or steering the magnetization of the transfer elements 36 of the next bottom superposed transfer array 216. The $H_T$ word drive field 277 in coincidence with the $\pm H_L$ steering field of the next bottom superposed transfer element 36 of transfer array 214 rotates or biases the magnetization of the next top transfer elements 36 of transfer array 214 toward alignment with their easy axes — see FIG. 9. When $H_T$ word drive field 277 is terminated at time $t_{68}$ the biased magnetization of the transfer elements 36 of transfer array 216 fall into alignment along their easy axes in a substantially closed (except for their gaps) flux path in a clockwise or counterclockwise orientation as determined by the polarity of the influencing steering field $\pm H_L$ of the next bottom superposed transfer elements 36 of transfer array 214. This completes the transfer of the information stored in transfer array 214 into transfer array 216.

When $H_T$ word drive field 278 is terminated at time $t_{72}$ the biased magnetization of the read elements 16 of read array 218 fall into alignment along their easy axes in a substantially closed (except for their gaps) flux path in a clockwise or counterclockwise orientation as determined by the polarity of the influencing steering field $\pm H_L$ of the next bottom superposed transfer elements 36 of transfer array 216. This completes the transfer of the information stored in transfer array 216 into read array 218.

Accordingly, at time $t_{72}$ upon termination of the $H_T$ word drive field 278 in read array 218, the information written into the word lines 14a, 14b, 14c, 14d of write array 204 over the time period $t_0 - t_{15}$ has been shifted or transferred through the superposed transfer arrays 206, 208, 210, 212, 214, 216 into the corresponding word lines 14a, 14b, 14c, 14d of read array 218. Further, it is apparent that in a manner similar to that discussed above new information could be written into write array 204 over a time period $t_{24} - t_{40}$ and shifted through the same superposed transfer arrays into read array 218 at time $t_{96}$ upon termination of $H_T$ word drive field 278*a*.

If the information stored in read array 218 is to be read out, the cyclical pulse signals making up the $H_T$ word drive fields previously discussed must be terminated in a manner for holding the stored information in their respectively associated arrays. For this read-out operation which is, e.g., to be initiated at a time $t_{116}$ the $H_T$ word drive field pulse sequence is terminated as illustrated in FIG. 12 so as to ensure the retention of all information in the memory stack 202. As with the previously discussed write-in operation, at time $t_{116}$, at the initiation of the read-out operation, word driver 230 couples an $H_T$ word drive field 280*a* to a selected one of the word lines 14 of read array 218, e.g., word line 14*a*. $H_T$ word drive field 280*a* being inductively coupled to the four read element 16 along the one selected word line 14*a* rotates the clockwise or counterclockwise oriented magnetization (previously aligned along their easy axes) away from their easy axes alignments inducing a corresponding polarity output signal in their respectively associated bit lines 12*a*, 12*b*, 12*c*, 12*d*. Such four output signals are coupled, in parallel, to gated sense amplifier 232 which produces, as an output, signals indicative of the binary "1" or "0" stored therein. In a like manner, at times $t_{120}$ , $t_{124}$, $t_{128}$ such $H_T$ word drive fields 280*b*, 280*c*, 280*d*, respectively, are coupled to word lines 14*b*, 14*c*, 14*d*, respectively, providing at gated sense amplifier 232 output signals that are indicative of the binary "1" or "0" stored therein.

Figure 13:
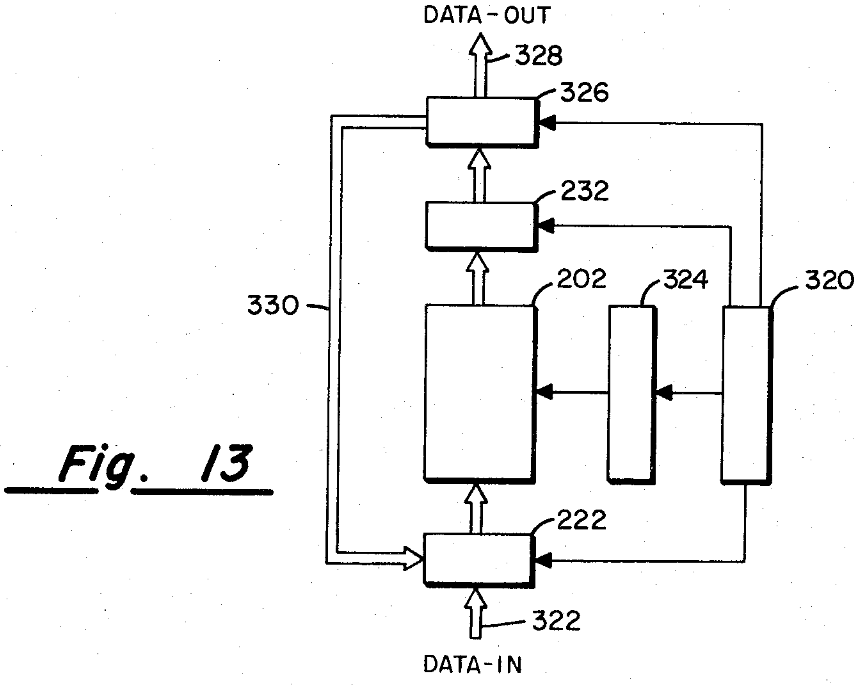
FIG. 13 is a block diagram of a memory system for recirculating read-out data back through the memory stack of FIG. 11.

It is apparent that the information written into read array 218 at time $t_{72}$ could be read out and transferred back into write array 204 such that the information stored in memory stack 202 could be shifted therethrough in a circulating manner. This is similar to the well-known read-restore memory cycle of DRO magnetizable memory systems illustrated in block diagram form in FIG. 13. In this method of operation controller 320 times data in on data-in lines 322, transfers such data through memory stack 202 into gated sense amplifiers 232, under control of word drivers 324 and bit drivers 222, and into a holding register 326. From holding register 326 the read-out data could becoupled to data-out lines 328 and/or data-restore lines 330 and be coupled bit drivers 222 for recirculation through memory stack 202.

What is claimed is:

1. A memory stack, comprising:

a plurality of two-dimensional memory planes, each of said memory planes comprising an array of similarly oriented magnetizable memory elements with each of said memory elements having a similarly oriented gap in its otherwise substantially closed flux path for providing an external steering field $\pm H_L$ that is oriented across the gap and along the substantially closed flux path aligned easy axis, the polarity of said steering field $\pm H_L$ indicating the particular binary data state that is stored in the bit-defining memory element;

said memory planes being oriented into a superposed memory stack with the corresponding similarly oriented memory elements of each of said memory planes being aligned in a superposed configuration with their respective gaps being similarly superposed for inductively coupling the steering field of the next bottom superposed memory element into the gap of the next top superposed memory element.

2. The memory stack of claim 1 wherein the bottom and top memory planes are write and read arrays, respectively, and the intermediate memory planes sandwiched therebetween are transfer arrays; and wherein said write and read arrays are substantially similar including a parallel set of word lines and an orthogonally oriented parallel set of bit/sense lines with a memory element oriented at each word line, bit/sense line intersection for defining a multibit word along each word line;

said transfer arrays include a parallel set of word lines with a plurality of memory elements oriented along each word line for defining a multibit word along each word line;

the next superposed bit defining memory elements of the superposed word lines of said write, transfer and read arrays inductively intercoupled by their respective steering fields.

3. The memory stack of claim 2 further including:

word drive means selectively coupled to the word lines of said write array for coupling a word drive field $H_T$ to a selected one of said word lines of said write array;

bit drive means selectively coupled to the bit lines of said write array for coupling a bit drive field $\pm H_L$ to all the bit lines associated with said one selected word line;

said word drive field $H_T$ and said bit drive fields $\pm H_L$ coincidentally setting the magnetization of the coincidentally affected bit defining memory elements into a selected one binary state.

4. The memory stack of claim 3 further including:

word drive means selectively coupled to the word lines of said transfer arrays and coupling a word drive field $H_T$ to selected superposed word lines of said transfer arrays for successively transferring the multibit word stored along a selected word line in said write array bit-parallel through the superposed word lines of said transfer arrays into the superposed word line of the top transfer array.

5. The memory stack of claim 4 further including:

word drive means selectively coupled to the word lines of said read array and coupling a word drive field $H_T$ to a selected one of said word lines of said read array for transferring the multibit word stored along a word line of said top transfer array into the superposed word line of said read array and subsequently reading out the multibit word transferred into said word line of said read array along the bit lines associated with the bit defining memory elements along the selected word line of the read array.

* * * * *